Patented Aug. 11, 1925.

1,549,729

UNITED STATES PATENT OFFICE.

PAUL BEEBE, OF AKRON, OHIO, ASSIGNOR TO THE GOODYEAR TIRE & RUBBER COMPANY, OF AKRON, OHIO, A CORPORATION OF OHIO.

PROCESS OF MANUFACTURING A RUBBERIZED FIBROUS COMPOSITION.

No Drawing.     Application filed January 17, 1923. Serial No. 613,274.

*To all whom it may concern:*

Be it known that I, PAUL BEEBE, a citizen of the United States, and resident of Akron, Ohio, have invented new and useful Improvements in Processes of Manufacturing a Rubberized Fibrous Composition, of which the following is a specification.

My invention pertains to a method of making a rubberized fibrous composition which may be utilized in a variety of capacities, such as for floor or wall coverings, as a substitute for leather, or for any other purpose to which a tough flexible porous water resistant composition may be adapted. My invention has particular relation to the method of treating fibrils prior to the deposition of rubber thereon.

The object of my invention is to provide an improved method of manufacturing a composition of the character designated which shall be more economical both of labor and materials than similar methods heretofore employed.

One method which may be employed in manufacturing a rubberized fibrous composition consists in dissolving into a liquid, in which the fibers are held in suspension, approximately twice the amount of rubber intended to be deposited upon the fibers in the form of individual coatings, the excess rubber being employed for the reason that ordinarily it has been impossible to precipitate more than approximately 50% of ordinary rubber from a solution upon the fibers. The remainder of the rubber precipitates in a flocculent state and segregates itself from the fibers in the liquid.

The reason for the phenomenon described appears to be that a small amount of water is contained in the fibers before they are mixed with the liquid in which the fibers are suspended. This condition frequently obtains even though the fibers have been passed through a drying chamber prior to being mixed with the liquid, on account of the fact that the fibers will absorb from 5% to 15% of their weight of moisture from the air, depending upon the length of time during which they are exposed and the humidity of the ambient medium. This moisture is commonly known as "equilibrium moisture" and is a relatively constant quantity for any given set of conditions.

I have found that, if substantially all the equilibrium moisture can be removed from the fibers, all of the rubber contained in the liquid in which the fibers are suspended tends to be precipitated upon the fibers rather than in a separated flocculent condition. In order to accomplish this it is necessary that the fibers be completely dehydrated and thereafter be retained in such manner as to prevent their absorbing any moisture from the atmosphere.

In practicing my invention the fibers are preferably beaten in water in the manner commonly employed in the manufacture of paper. The fibrils are then strained from the water and are placed in an anhydrous liquid, such for example, as toluol. If desired, in order to render the quantity of water contained in the fibers as small as possible, they may be dried by passing them through a heated chamber. The temperature of the binary mixture thus formed, having the fibers in suspension, is then raised to the boiling point of the mixture. The distillate of a toluol-water mixture consists of approximately four parts of toluol to one part of water. The quantity of water in the mixture which was in the fibers when placed in the toluol, even though a relatively high percentage of the weight of the fibers, is ordinarily but a very small percentage of the weight of the toluol employed. Therefore, substantially the entire amount of water may be removed from the mixture by distillation involving the evaporation of but a relatively small percentage of the toluol. The resulting mixture is anhydrous toluol having suspended therein a quantity of dehydrated fibers.

Although I have mentioned toluol as the anhydrous liquid in question, it will be apparent that any other liquid of like nature may be employed. However, I prefer to use a rubber solvent such as toluol, benzol, gasoline, or the like, as the rubber may then be dissolved in the liquid in which the fibers have been dehydrated without any additional manufacturing steps, which might be necessary if other than a rubber solvent were employed for this purpose.

From this point in the manufacturing process several different methods for securing the proper deposition of rubber on the fibers may be employed. For example, a quantity of rubber dissolved in toluol may be added to the toluol-fibril mixture, after which a sufficient quantity of alcohol or acetone may be added to render the mixture a precipitant, thus causing a deposition of the rubber upon the fibers. The rubber coated fibers may then be formed into a suitable material, either by molding the same, or by causing it to pass through a Fourdrinier machine adapted for the manufacture of the particular product in question.

From the foregoing description it will be apparent that I have provided a method whereby all of the rubber in solution is firmly deposited upon the fibers, owing to the fact that I have succeeded in dehydrating or substantially dehydrating the fibers and retaining them in a dehydrated condition until the rubber has been deposited thereon. The distillate of the binary mixture is preferably condensed and the toluol recovered, thus eliminating the wastage of any material whatsoever. As the total quantity of rubber dissolved is that quantity which is desired to be deposited upon the fibers and since the total quantity of toluol employed exceeds but very little the quantity necessary for the solution of the quantity of rubber in question, it will be apparent that the handling of the reduced quantities of both toluol and alcohol renders my method more economical than is the other method described.

Although I have described in detail but a single application of my invention it will be apparent to those skilled in the art that it is not so limited but that many minor modifications and changes may be made therein without departing from the spirit of my invention or from the scope of the appended claims.

What I claim is:

1. The method of treating fibers containing moisture which comprises immersing them in toluol, distilling off the moisture in the fibers and precipitating a film of rubber on the water free fibers.

2. The method of treating fibers which comprises beating them in water, immersing them in toluol, distilling off the water contained in the fibers and precipitating a film of rubber on the fibers.

3. A method of manufacturing a rubberized fibrous composition which comprises drying the fibers free of their equilibrium moisture, mixing them with a rubber solution, precipitating the mixture, and removing the liquid phase.

4. A method of manufacturing a rubberized fibrous composition which comprises drying the fibers by heating them in the presence of a liquid non-miscible with water, mixing the fibers with a solution of rubber, precipitating the mixture and removing the liquid phase.

5. A method of manufacturing a rubberized fibrous composition which comprises drying the fibers free of their equilibrium moisture by heating in the presence of a liquid hydrocarbon, mixing the dried fibers with a solution of rubber, precipitating the mixture and separating the two phases by filtering the suspension.

6. A method of manufacturing a rubberized fibrous composition which comprises suspending the fibers in a rubber solvent, freeing the fibers of their equilibrium moisture by a prolonged heating of the suspension, mixing the dried fibers with a solution of rubber, precipitating the mixture and filtering the mass free from its liquid phase.

In witness whereof, I have hereunto signed my name.

PAUL BEEBE.